United States Patent
Okabe

(10) Patent No.: US 9,590,255 B2
(45) Date of Patent: Mar. 7, 2017

(54) FUEL CELL INCLUDING SEPARATOR WITH ELLIPTICAL SHAPED EMBOSSED PORTIONS IN GAS INLET AND OUTLET PORTIONS

(75) Inventor: Hiroki Okabe, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 271 days.

(21) Appl. No.: 14/232,395

(22) PCT Filed: Jul. 20, 2011

(86) PCT No.: PCT/JP2011/066465
§ 371 (c)(1),
(2), (4) Date: Jan. 13, 2014

(87) PCT Pub. No.: WO2013/011578
PCT Pub. Date: Jan. 24, 2013

(65) Prior Publication Data
US 2014/0134511 A1 May 15, 2014

(51) Int. Cl.
*H01M 8/02* (2016.01)
*H01M 8/04* (2016.01)
*H01M 8/24* (2016.01)

(52) U.S. Cl.
CPC ....... *H01M 8/0247* (2013.01); *H01M 8/0258* (2013.01); *Y02E 60/50* (2013.01)

(58) Field of Classification Search
CPC ........................ H01M 8/0247; H01M 8/0258
USPC ................................. 429/437, 457, 514, 518
See application file for complete search history.

(56) References Cited

U.S. PATENT DOCUMENTS

| | | | |
|---|---|---|---|
| 2009/0325036 A1 | 12/2009 | Blank et al. | |
| 2010/0055540 A1* | 3/2010 | Sugiura ............... | H01M 8/0206 429/434 |
| 2010/0310957 A1 | 12/2010 | Sugiura et al. | |
| 2010/0316924 A1 | 12/2010 | Sugiura et al. | |
| 2011/0053031 A1 | 3/2011 | Kojima et al. | |

(Continued)

FOREIGN PATENT DOCUMENTS

| | | |
|---|---|---|
| DE | 102005057045 A1 | 6/2007 |
| JP | 11-283637 A | 10/1999 |

(Continued)

*Primary Examiner* — Sean P Cullen
(74) *Attorney, Agent, or Firm* — Andrews Kurth Kenyon LLP

(57) ABSTRACT

A fuel cell includes a separator having an uneven shape integrally formed on the front and the back surfaces thereof, so that gas can flow in a recessed portion of one surface and cooling water can flow in a recessed portion of the other surface. The separator has a gas passage portion connected to a manifold via a gas outlet/inlet portion. A first continuous portion that connects the gas outlet/inlet portion to the manifold is different from a second continuous portion that connects the gas outlet/inlet portion to the gas passage in communicating width. The gas outlet/inlet portion has an elliptical embossed portion that protrudes toward the gas passage side. A major axis direction of the embossed portion inclines relative to a straight axis connecting one end of the first continuous portion and one end of the second continuous portion toward a straight axis connecting the other ends of the first and second continuous portions.

3 Claims, 3 Drawing Sheets

(56) References Cited

U.S. PATENT DOCUMENTS

2012/0009502 A1    1/2012   Darling et al.

FOREIGN PATENT DOCUMENTS

| JP | 2006-012466 A | 1/2006 |
| JP | 2006-032008 A | 2/2006 |
| JP | 2006-278177 A | 10/2006 |
| JP | 2007-073192 A | 3/2007 |
| JP | 2007-172874 A | 7/2007 |
| JP | 2007-328969 A | 12/2007 |
| JP | 2010-118329 A | 5/2010 |
| JP | 2010-282868 A | 12/2010 |
| JP | 2010-287474 A | 12/2010 |
| JP | 2011-054404 A | 3/2011 |
| WO | 2010114555 A1 | 10/2010 |

\* cited by examiner

FUEL CELL INCLUDING SEPARATOR WITH ELLIPTICAL SHAPED EMBOSSED PORTIONS IN GAS INLET AND OUTLET PORTIONS

CROSS-REFERENCE TO RELATED APPLICATIONS

This is a national phase application based on the PCT International Patent Application No. PCT/JP2011/066465 filed on Jul. 20, 2011, the entire contents of which are incorporated herein by reference.

TECHNICAL FIELD

The present invention relates to a fuel cell.

BACKGROUND ART

A fuel cell includes a membrane electrode assembly that has an anode electrode disposed on one surface of an electrolyte film and a cathode electrode disposed on the other surface of the electrolyte film. A fuel cell stack can be formed by laminating a plurality of unit cells, each including a gas passage layer and a separator that sandwich the membrane electrode assembly. Fuel gas that contains hydrogen is supplied to the anode electrode. The supplied fuel gas is converted into protons according to the electrochemical reaction expressed using the following formula (1). The generated protons pass through the electrolyte film and move toward the cathode electrode. Oxidant gas that contains oxygen is supplied to the other cathode electrode. The oxidant gas reacts with the protons supplied from the anode electrode. Water can be generated as a result of the electrochemical reaction expressed using the following formula (2). The electric energy can be obtained from the electrodes when the electrochemical reaction occurs on the electrolyte film side surfaces of a cell structure including the above-described pair of electrodes.

Anode reaction: $H_2 \rightarrow 2H^+ + 2e^-$ (1)

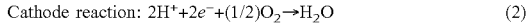

Cathode reaction: $2H^+ + 2e^- + (1/2)O_2 \rightarrow H_2O$ (2)

The fuel gas and the oxidant gas supplied to respective electrodes pass through a fuel gas passage and an oxidant gas passage formed on a gas diffusion layer side surface of the separator. Each of the fuel gas passage and the oxidant gas passage is a groove having an uneven shape. The uneven grooves are integrally formed on the front and the back surfaces of the separator. One of the surfaces defines the fuel gas passage and the oxidant gas passage. The other surface defines a cooling water passage. More specifically, at the anode (negative electrode) side separator, the fuel gas passes through an uneven portion formed on the gas diffusion layer side. The cooling water passes through an uneven portion formed on the opposite side of the gas diffusion layer. Further, at the cathode (positive electrode) side separator, the oxidant gas passes through an uneven portion formed on the gas diffusion layer side. The cooling water passes through an uneven portion formed on the opposite side of the gas diffusion layer.

Patent Literature 1 discloses a fuel gas passage and an oxidant gas passage (hereinafter, collectively referred to as gas passage) that are connected via a manifold and a gas outlet/inlet portion formed outside a separator. The gas outlet/inlet portion has a circular shape, which can be formed through embossing finish. The embossing finish is intended to straighten the fuel gas and the oxidant gas (hereinafter, collectively referred to as "reactant gas") and can adequately maintain the distributivity for the manifold and the gas passage.

The performance of the fuel cell is greatly dependent on the resistance value and the reactant gas fluidity in the separator. Therefore, reducing the contact resistance between the separator and the gas diffusion layer as well as reducing the reactant gas pressure loss in the separator are required. If the embossed finish separator discussed in Patent Literature 1 is laminated with a gas diffusion layer and a membrane electrode assembly, the separator is brought into contact with a neighboring gas diffusion layer at the embossed portion and the reactant gas flows in the area other than the embossed portion of the separator. Accordingly, to adequately maintain the contact resistance between the gas diffusion layer and the separator, it is desired to enlarge the contact area between the embossed portion and the gas diffusion layer. On the other hand, to adequately maintain the gas fluidity and suppress the gas pressure loss, it is desired to decrease the area of the embossed portion so that the gas passage can be secured sufficiently. More specifically, the contact resistance and the gas pressure in the gas outlet/inlet portion are in a trade-off relationship. Thus, the design of the gas outlet/inlet portion and the embossed portion is required to satisfy both of the above-described requirements.

PRIOR ART REFERENCE

Patent Literature

Patent Literature 1: Japanese Published Unexamined patent Application No. 2007-73192

SUMMARY OF THE INVENTION

Problem to be Solved by the Invention

However, according to the circular embossed portion discussed in Patent Literature 1, if the contact area between the embossed portion and the gas diffusion layer is increased, the collision area of the reactant gas and the embossed portion increases in the flow direction of the reactant gas, although the contact resistance can be reduced. More specifically, the pressure loss of the reactant gas may increase, and the fluidity of the reactant gas may decrease. As a result, the power generation performance may deteriorate. Therefore, at the gas outlet/inlet portion of a fuel cell separator, it is required to employ an appropriate design capable of reducing the contact resistance and the pressure loss of the reactant gas for the gas outlet/inlet portion and the embossed portion. Further, in a press separator, the reactant gas and the cooling water flow on the front and the back surfaces of the separator. Therefore, it is desired to provide a separator structure that can reduce the contact area and the fluid pressure loss at both surfaces of the separator.

The present invention is intended to provide a fuel cell capable of realizing both the contact resistance reduction and the fluid pressure loss suppression in the press separator, and capable of improving the power generation performance of the fuel cell.

Means for Solving Problem

The present invention provides a fuel cell, which includes a pair of gas diffusion layers that sandwich a membrane electrode assembly, and separators disposed in such a way as to sandwich the pair of gas diffusion layers, wherein a gas passage having an uneven shape is formed on a gas diffusion layer side surface of the separator. The gas passage is connected to a gas manifold via a gas inlet portion and a gas outlet portion. At least one of a first continuous portion that connects the gas inlet portion to the gas manifold, a second continuous portion that connects the gas inlet portion to the gas passage, a first continuous portion that connects the gas outlet portion to the gas manifold, and a second continuous portion that connects the gas outlet portion to the gas passage, is different in communicating width. At least one of the gas inlet portion and the gas outlet portion includes an embossed portion having an elliptical shape in a plan view and protruding toward the gas diffusion layer side of the separator, wherein a major axis direction of the elliptical shape of the embossed portion inclines relative to a straight axis connecting one end of the first continuous portion to one end of the second continuous portion toward a straight axis connecting the other end of the first continuous portion to the other end of the second continuous portion.

According to the fuel cell having the above-described configuration, the contact area between the embossed portion and the gas diffusion layer can be increased in the major axis direction of the embossed portion. Therefore, it is feasible to reduce the contact resistance without reducing the gas pressure of the reactant gas that flows in the major axis direction. Further, the reactant gas passage width in the minor axis direction becomes narrow when the contact area between the gas diffusion layer and the embossed portion in the major axis direction is increased. However, when the reactant gas passage width is narrow, it is feasible to reduce the bending amount of the gas diffusion layer. Therefore, they cancel each other out. As a whole, the gas pressure of the reactant gas that flows in the minor axis direction can be prevented from decreasing. Thus, it is feasible to prevent the gas pressure from lowering in both of the major axis direction and the minor axis direction of the embossed portion. More specifically, suppressing the gas pressure loss and reducing the contact resistance at the gas outlet/inlet portion can be satisfied simultaneously.

Further, if the first continuous portion and the second continuous portion are different in communicating width, the fluidity of the reactant gas is different in each portion of least one of the gas inlet portion and the gas outlet portion. There is an area where the reactant gas flows smoothly from the first continuous portion to the second continuous portion. On the other hand, there is an area where the reactant gas does not flow smoothly. In such a case, it is feasible to adjust the pressure loss of the reactant gas at the embossed portion, especially at the embossed portion of the gas inlet portion, by disposing the major axis direction in such a way as to incline relative to the straight axis connecting one end of the first continuous portion to one end of the second continuous portion toward the straight axis connecting the other end of the first continuous portion to the other end of the second continuous portion. It is feasible to uniformly distribute the gas that flows from the gas inlet portion to the gas passage with respect to the flow amount and the pressure. More specifically, regardless of the position and the angle of the first continuous portion and the second continuous portion, it is feasible to improve the diffusibility and the distributivity with respect to the gas flow amount and the gas pressure when the gas flows into respective gas passages from the gas inlet portion.

In the fuel cell having the above-described configuration, it is desired that the straight axis connecting the one end of the first continuous portion to the one end of the second continuous portion and a passage side surface portion of the gas passage at front and rear regions of at least one of the gas inlet portion and the gas outlet portion are aligned on substantially the same straight line.

According to the fuel cell having the above-described configuration, the angle between the flow direction of the reactant gas and the major axis direction of the embossed portion can be reduced in at least one of the gas inlet portion and the gas outlet portion. Therefore, the pressure loss of the reactant gas at the embossed portion can be effectively reduced.

Further, in the fuel cell having the above-described configuration, it is desired that a cooling water passage is formed on the opposite side of a gas passage surface of the separator, and a cooling water inlet portion and a cooling water outlet portion are formed on back surfaces of the gas inlet portion and the gas outlet portion, respectively. The cooling water passage is connected to a cooling water manifold via the cooling water inlet portion and the cooling water outlet portion. At least one of the cooling water inlet portion and the cooling water outlet portion includes circular embossed portions that protrude toward a cooling water passage surface. Further, it is desired that the flow direction of at least one of the cooling water that flows into the cooling water inlet portion from the cooling water manifold, and the cooling water that flows from the cooling water outlet portion to the cooling water manifold is not parallel to the flow direction of the cooling water in the cooling water passage.

According to the fuel cell having the above-described configuration, it is feasible to suppress the pressure loss in both the reactant gas and the cooling water at the front and back sides of the separator. The separator is brought into contact with a separator of a neighboring cell on the cooling water passage side. Therefore, the contact resistance is lower compared to the gas passage side. Bending does not occur in the cooling water passage. On the other hand, the cooling water is low in diffusibility compared to the reactant gas. Therefore, an area increase of the embossed portion greatly reduces the cross-sectional area of the passage and increases the pressure loss. Accordingly, it is feasible to suppress the pressure loss of the cooling water and improve the diffusibility by forming a gas passage side embossed portion to have an elliptical shape and forming a cooling water passage side embossed portion to have a circular shape. Thus, it is feasible to reduce the contact resistance and suppress the pressure loss of the fluid on both the gas passage side and the cooling water passage side. As a result, the output of the fuel cell can be improved.

Effect of the Invention

The present invention can provide a fuel cell separator capable of not only reducing the contact resistance but also suppressing the gas pressure loss at least at a gas inlet portion or a gas outlet portion of a fuel cell separator, and can provide a fuel cell that includes the fuel cell separator having the above-described configuration.

MODE FOR CARRYING OUT THE INVENTION

Figure 1:
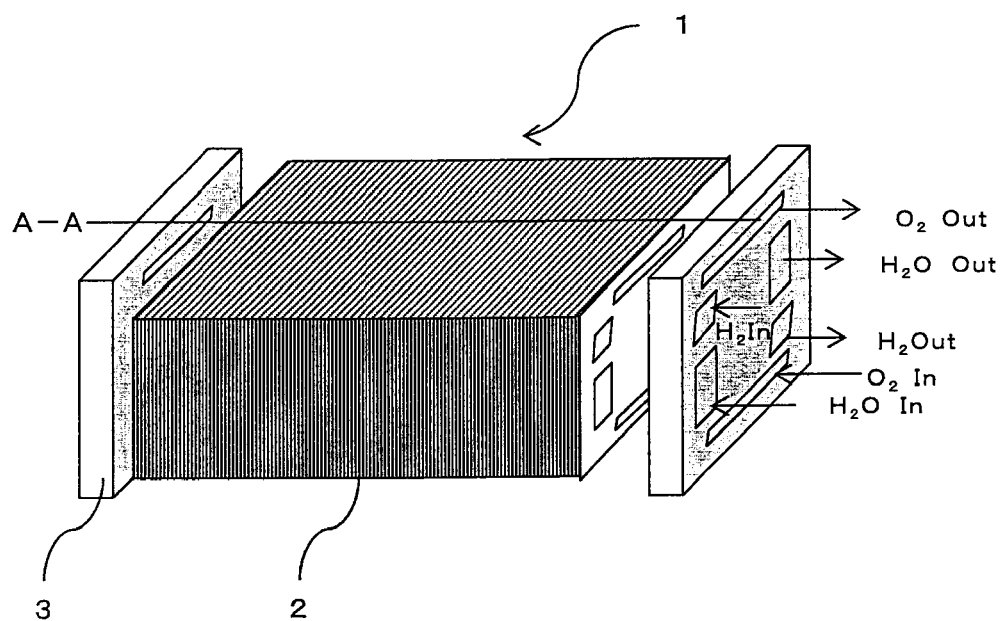
FIG. 1 illustrates a fuel cell stack according to an embodiment of the present invention.

An embodiment of the present invention is described below with reference to FIG. 1 to FIG. 4. As illustrated in FIG. 1, the fuel cell stack 1 includes a plurality of fuel cell units 2 (hereinafter, each fuel cell unit is referred to as a cell 2). The fuel cell stack 1 can be formed by putting one cell unit on another. The multilayered cells 2 are electrically connected in series. The current obtainable by the power generation of each cell 2 can be collected by a pair of current collectors 3 provided at both end portions of the multilayered cells 2, and can be supplied to an electric power device, such as an electric load or a secondary battery. The stack structure employed in the present embodiment includes a plurality of multilayered cells 2. However, the stack can be constituted by a single cell.

Figure 2:
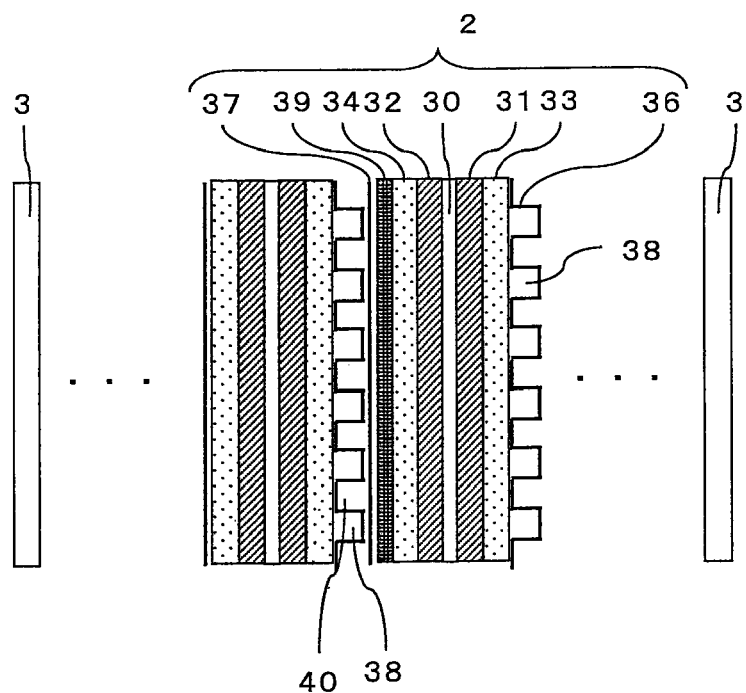
FIG. 2 illustrates a fuel cell unit according to an embodiment of the present invention.

FIG. 2 illustrates a cross-sectional view of the cell 2, which is taken along an A-A' line illustrated in FIG. 1. FIG. 2 illustrates two multilayered cells 2 and the current collectors 3 disposed at both end portions. The cell 2 includes a membrane electrode assembly (MEA) at its central portion. The membrane electrode assembly includes an electrolyte film 30 sandwiched by an anode catalyst layer 31 and a cathode catalyst layer 32. The electrolyte film 30 can be, for example, formed by solid polymer electrolyte having proton conductivity. The anode catalyst layer 31 and the cathode catalyst layer 32 can be, for example, formed by platinum carrying carbon. The anode catalyst layer 31 is functionally operable as a catalyst layer that can promote the generation of protons in hydrogen. The cathode catalyst layer 32 is functionally operable as a catalyst layer that can promote the reaction of protons and oxygen.

The cell 2 includes an anode diffusion layer 33 and a cathode diffusion layer 34 disposed at both ends of the membrane electrode assembly. The anode diffusion layer 33 and the cathode diffusion layer 34 are functionally operable to diffuse fuel gas and oxidant gas and supply the diffused gas to the anode catalyst layer 31 and the cathode catalyst layer 32. The anode diffusion layer 33 and the cathode diffusion layer 34 can be configured by an appropriate material having electrical conductivity and gas permeability, such as a carbon paper or a carbon fiber (including a carbon cloth). It is desired that the anode diffusion layer 33 and the cathode diffusion layer 34 have water repellency. For example, the water-repellent layer can be formed using fluorinated polymer, such as polytetrafluoroethylene (PTFE), tetrafluoroethylene/hexafluoropropylene copolymer (FEP), and carbon black. The anode diffusion layer 33 and the cathode diffusion layer 34 can be formed by joining the water-repellent layer with an assembly of carbon fibers.

The cell 2 includes an anode separator 36 and a cathode separator 37 that sandwich both ends of the anode diffusion layer 33 and the cathode diffusion layer 34. The anode separator 36 is a conductive material (e.g., a metallic member) that has an uneven shape on both the front and the back surfaces that can be formed by press working. The anode separator 36 forms a groove 38 on the surface that contacts the anode diffusion layer 33 and a groove 40 on the surface that contacts the cathode separator 36. Further, the cell 2 includes a porous body passage 39 positioned between the cathode diffusion layer 34 and the cathode separator 36.

When anode gas and cathode gas are supplied externally, the anode gas and the cathode gas pass through the groove 38 and the porous body passage 39. Then, the anode gas and the cathode gas flow into the anode diffusion layer 33 and the cathode diffusion layer 34. Finally, the anode gas and the cathode gas are supplied to the membrane electrode assembly. Cooling water flows in the groove 40 formed between the cathode separator 37 and the anode separator 36 of a neighboring cell. In the present embodiment, the porous body passage 39 is provided between the cathode separator 37 and the cathode diffusion layer 34 so that the oxidant gas can flow in the porous body passage 39. However, another configuration that does not include the porous body passage 39 is also employable. For example, the cathode separator 37 can be configured to have an uneven shape on both the front and the back surfaces so that the oxidant gas can flow in a groove defined between the cathode separator 37 and the cathode diffusion layer 34.

Figure 3:
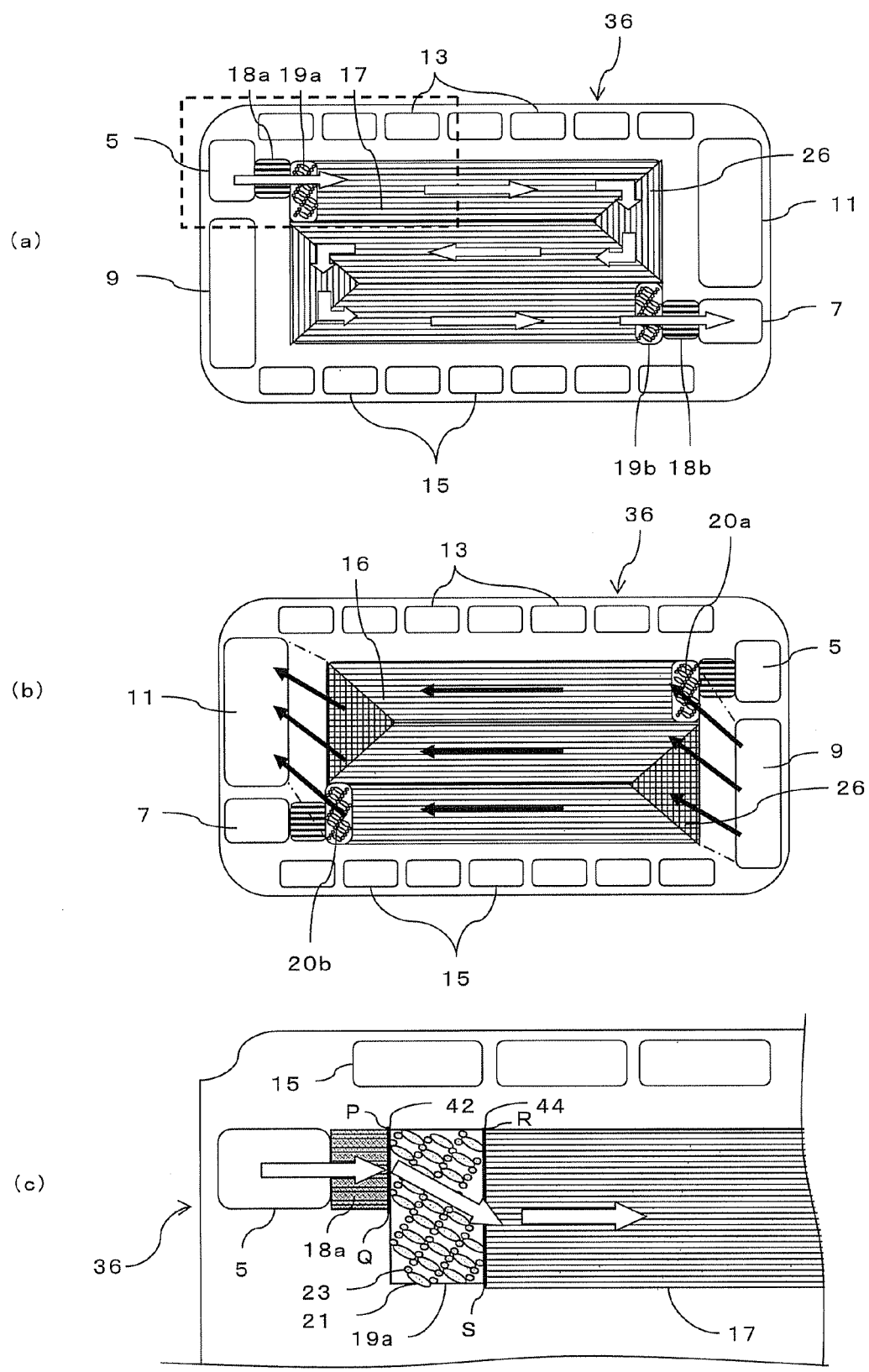
FIG. 3 illustrates a separator according to an embodiment of the present invention.

FIG. 3 (a) illustrates the anode separator 36, which is seen from the anode side (i.e., from the surface that contacts the anode gas diffusion layer). The anode separator 36 has an uneven shape, which can be formed by press working. The uneven shape of the back surface and the uneven shape of the front surface are mutually reversed. A groove having an uneven shape is formed in the central region of the anode separator 36. A gas passage 17 is formed on an anode gas diffusion layer side surface (i.e., the forward side of the drawing surface). A cooling water passage 16 is formed on a cooling water passage side surface (i.e., the back side of the drawing surface). The anode separator 36 includes a fuel gas supply manifold 5, an oxidant gas supply manifold 13, and a cooling water supply manifold 9, which are disposed along the outer periphery. The anode separator 36 includes a fuel gas discharge manifold 7, an oxidant gas discharge manifold 15, and a cooling water discharge manifold 11, which are positioned at an opposite side over the gas passage 17 in a confronting relationship with the above-described supply manifolds. The cooling water passage 16 is formed on the back surface of the gas passage 17. The above-described supply/discharge manifolds are provided so as to extend thoroughly in the lamination direction of the cells 2. The fuel gas passage, the oxidant gas passage, and the cooling water passage are formed in the multilayered unit cells 2. In this case, the fuel gas supply manifold 5 and the cooling water supply manifold 9 are disposed adjacently at one peripheral edge of the anode separator 36. Similarly, the fuel gas discharge manifold 7 and the cooling water discharge manifold 11 are disposed adjacently at the opposite peripheral edge over the gas passage 17 and the cooling water passage 16.

The gas passage 17 has a bellows-like bent structure extending from the fuel gas supply manifold 5 to the fuel gas discharge manifold 7. A gas continuous hole and a gas inlet/outlet portion are disposed between the fuel gas supply manifold 5 and the gas passage 17 and between the gas passage 17 and the fuel gas discharge manifold 7. More specifically, the gas continuous hole has an inlet side gas continuous hole 18a and an outlet side gas continuous hole 18b. The gas inlet/outlet portion has a gas inlet portion 19a and a gas outlet portion 19b. The fuel gas supplied from the fuel gas supply manifold 5 passes through the inlet side gas continuous hole 18a and then flows into the gas passage 17 via the gas inlet portion 19a. While changing its flowing direction along the bellows-like bent structure, the fuel gas flows in the gas passage 17. Then, after passing through the gas outlet portion 19b and the outlet side gas continuous hole 18b, the fuel gas is discharged from the gas passage 17 to the fuel gas discharge manifold 7. In FIG. 3(a), outline arrows indicate the flow of the fuel gas. The gas inlet portion 19a and the gas outlet portion 19b are greater in passage width than the inlet side gas continuous hole 18a and the outlet side gas continuous hole 18b, respectively. The gas in the gas inlet portion 19a diffuses toward the gas passage 17. The gas flowing from the gas passage 17 to the outlet side continuous hole 18b is condensed in the gas outlet portion 19b.

FIG. 3 (b) illustrates the anode separator 36, which is seen from the cooling water passage side (i.e., from the surface that contacts a neighboring cell), in which black arrows indicate the flow of the cooling water. The cooling water is supplied from the cooling water supply manifold 9. The cooling water flows straight in the cooling water passage 16, and exits from the cooling water discharge manifold 11. In a folded region 26 of the gas passage 17, grooves extending in the direction perpendicular to the gas flow direction are formed at a cooling water passage 16 side protruding portion. Thus, the cooling water can flow in four directions.

As described above, the fuel gas supply manifold 5 and the cooling water supply manifold 9 are disposed adjacently at one peripheral edge of the anode separator 36. Therefore, the cooling water flows diagonally relative to the cooling water passage 16 in the region where the cooling water passage 16 faces the fuel gas supply manifold 5 (i.e., the back surface of the gas inlet portion 19a). Similarly, the cooling water flows diagonally relative to the cooling water passage 16 in the region where the cooling water passage 16 faces the fuel gas discharge manifold 7 (i.e., the back surface of the gas outlet portion 19b). In the following description, the back surface of the gas inlet portion 19a is referred to as a cooling water inlet portion 20a. The back surface of the gas outlet portion 19b is referred to as a cooling water outlet portion 20b. The cooling water inlet portion 20a and the cooling water outlet portion 20b are collectively referred to as a cooling water outlet/inlet portion. More specifically, in the cooling water inlet portion 20a, the cooling water flows diagonally into the cooling water passage 16. Then, the cooling water changes its flow direction and flows along the flow direction of the cooling water passage 16. The cooling water, after passing through the cooling water passage 16, flows straight into the cooling water outlet portion 20b. The cooling water changes its flow direction diagonally at the cooling water outlet portion 20b. Then, the cooling water flows toward the cooling water discharge manifold 11. Meanwhile, the oxidant gas is supplied from the oxidant gas supply manifold 13. The oxidant gas flows in the porous body passage 39 (not illustrated in FIG. 3) and exits from the oxidant gas discharge manifold 15.

Figure 4:
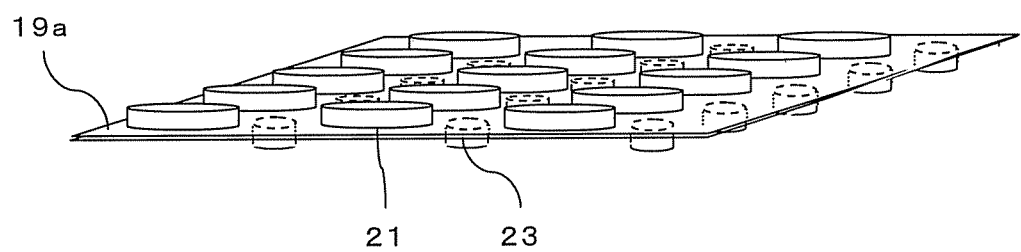
FIG. 4 illustrates an embossed portion that is part of a gas outlet/inlet portion of the separator according to an embodiment of the present invention.

FIG. 3(c) illustrates an enlarged view of a portion indicated by a dotted line in FIG. 3(a). The outline arrows indicate the flow of the fuel gas supplied from the fuel gas supply manifold 5. The fuel gas passes through the inlet side gas continuous hole 18a and the gas inlet portion 19a, and flows into the gas passage 17. The boundary portion between the inlet side continuous hole 18a and the gas inlet portion 19a is referred to as first continuous portion 42. The boundary portion between the gas inlet portion 19a and the gas passage 17 is referred to as second continuous portion 44. The gas inlet portion 19a includes elongated embossed portions 21 and round embossed portions 23. Each elongated embossed portion 21 has an elliptical shape in the planar view of the anode separator 36. A plurality of aligned elongated embossed portions 21 are disposed at equal intervals in such a manner that the major axis direction of the elliptic shape inclines relative to an axis regulated by a straight line PR connecting one end P of the first continuous portion 42 and one end R of the second continuous portion 44 toward an axis regulated by a straight line QS connecting the other end Q of the first continuous portion 42 and the other end S of the second continuous portion 44. In other words, the major axis direction of the elliptical shape in the planar view of the elongated embossed portion 21 is not parallel to the axis regulated by the straight line PR. The major axis has a predetermined inclined angle θ relative to the axis regulated by the straight line PR. If Θ represents the angle formed between the axis regulated by the straight line PR and the axis regulated by the straight line QS, two angles θ and Θ satisfy a relationship 0<θ≤Θ. Alternatively, the major axis direction of the elliptical shape has a predetermined angle relative to the gas flow direction of the fuel gas in the inlet side gas continuous hole 18a and the gas flow direction of the fuel gas in the gas passage 17. The axis regulated by the straight line PR is parallel to the gas flow direction of the fuel gas in the inlet side gas continuous hole 18a and the gas flow direction of the fuel gas in the gas passage 17. On the other hand, the round embossed portions 23 are disposed at equal intervals between the plurality of aligned elongated embossed portions. Each elongated embossed portion 21 protrudes toward the anode diffusion layer 33 side (i.e., the forward side of the drawing surface). Each round embossed portion 23 protrudes toward the side contacting the cathode separator of a neighboring cell (i.e., the backward side of the drawing surface). FIG. 4 is perspective view illustrating the gas inlet portion 19a. The upper surface corresponds to the anode diffusion layer 33 side.

An enlarged view of the outlet side gas continuous hole 18b and the gas outlet portion 19b is similar to FIG. 3 (c) that illustrates the enlarged view of the inlet side gas continuous hole 18a and the gas inlet portion 19a. More specifically, the gas outlet portion 19b includes elongated embossed portions and round embossed portions. Each elongated embossed portion has an elliptical shape in the planar view of the anode separator 36. The major axis direction of the elliptical shape has a predetermined angle relative to the gas flow direction of the fuel gas in the gas outlet portion 19b and the gas flow direction of the fuel gas in the outlet side gas continuous hole 18b. The elongated embossed portion protrudes toward the anode diffusion layer 33 side (i.e., the forward side of the drawing surface). The round embossed portion protrudes toward the side contacting the cathode separator of a neighboring cell (i.e., the backward side of the drawing surface).

The fuel cell apparatus according to the present embodiment can reduce the contact resistance between the anode separator 36 and the anode gas diffusion layer 33 while suppressing the gas pressure loss in the gas outlet/inlet portion. More specifically, in the major axis direction of the elongated embossed portion 21, the contact resistance can be reduced by increasing the contact area between the elongated embossed portion 21 and the anode diffusion layer 33, while suppressing the pressure loss in the gas flow direction. Further, in the minor axis direction of the elongated embossed portion 21, if the contact area between the separator and the gas diffusion layer increases, the amount of the diffusion layer bending into the gas passage 17 can be reduced although a cross-sectional area of the gas passage 17 decreases. Therefore, the entire gas pressure loss can be suppressed. Further, according to the employed layout of the elongated embossed portion 21, the major axis direction inclines relative to the straight axis connecting one ends of the first continuous portion 42 and the second continuous portion 44 toward the straight axis connecting the other ends of the first continuous portion 42 and the second continuous portion 44. Therefore, the elongated embossed portion 21 can adjust the amount of gas pressure loss by appropriately setting the length and the angle of the passage extending from the inlet side gas continuous hole 18a to the gas passage 17. When the reactant gas flows into the gas passage 17 from the gas inlet portion 19a, the gas pressure and the gas flow amount become uniform. More specifically, the pressure of the gas flowing into the gas passage 17 can be made uniform by increasing the amount of gas pressure loss caused by the elongated embossed portion 21 at a portion where the reactant gas can flow smoothly, and decreasing the amount of gas pressure loss caused by the elongated embossed portion 21 at a portion where the reactant gas cannot flow smoothly. A portion where the gas continuous hole, the gas outlet/inlet portion, and the gas passage 17 are arrayed straight is an example of the portion where the reactant gas can smoothly flow in the gas outlet/inlet portion.

Further, it is feasible to suppress the pressure loss in both the reactant gas and the cooling water at the front and back sides of the anode separator 36 by employing the configuration that includes the elongated embossed portion 21 protruding toward the gas passage side and the round embossed portion 23 protruding toward the cooling water passage side at the gas outlet/inlet portion of the anode separator 36. A cooling water passage surface of the anode separator 36 is brought into contact with the cathode separator 37 of a neighboring cell. Therefore, the bending of the cathode separator 37 in the cooling water passage 16 can be prevented. Therefore, if the area of the embossed portion is increased on the cooling water passage surface, only the pressure loss occurs according to the reduction in the cross-sectional area of the cooling water passage 16. The pressure loss caused in this case cannot be cancelled by the reduction in the bending amount. Further, the diffusibility of the cooling water is lower than that of the reactant gas. Therefore, the amount of pressure loss according to the area increase of the embossed portion is greater than that of the gas passage 17. Accordingly, it is effective to suppress the pressure loss using the round embossed portion (not the elongated embossed portion) in the cooling water passage surface.

Especially, as described in the present embodiment, when the gas flow direction in the gas outlet/inlet portion is different from the gas flow direction in the gas passage 17, and further, when the cooling water flow direction in the cooling water outlet/inlet portion formed on the back surface is different from the cooling water flow direction in the cooling water passage 16, the amount of pressure loss in the reactant gas and the cooling water tends to increase at a change point of the flow direction. In this respect, a fuel cell having the above-described configuration according to the present embodiment can reduce the pressure loss in the reactant gas and the cooling water, even when the flow direction of the reactant gas or the cooling water is changed as described above. Accordingly, the fuel cell having the above-described configuration according to the present embodiment can reduce the contact resistance between the anode separator 36, the anode diffusion layer 33, and the cathode separator 37 of a neighboring cell. Further, the fuel cell having the above-described configuration according to the present embodiment can reduce the amount of pressure loss in the reactant gas and the cooling water and can improve the diffusibility. Thus, the power generation efficiency can be improved.

In the present embodiment, each of the gas inlet portion 19a and the gas outlet portion 19b has the elongated embossed portions 21 and the round embossed portions 23. However, it is also useful to provide a combination of the elongated embossed portions 21 and the round embossed portions 23 only in the gas inlet portion 19a. Alternatively, it is useful to provide a combination of the elongated embossed portions 21 and the round embossed portions 23 only in the gas outlet portion 19b. As another embodiment, it is useful to provide a combination of the elongated embossed portions 21 and the round embossed portions in the gas inlet portion 19a and provide only the elongated embossed portions or the round embossed portions in the gas outlet portion 19b. In short, the gas inlet portion 19a and the gas outlet portion 19b are not always required to be symmetrical and can be asymmetric in shape. At least one of the gas inlet portion 19a and the gas outlet portion 19b is required to have the elongated embossed portions 21 that protrude toward the diffusion layer. Further, the major axis direction of the elliptical shape in the planar view of the elongated embossed portion is diagonally disposed to have a predetermined angle relative to the gas flow direction of the fuel gas. The following are possible combinations of the elongated embossed portions and the round embossed portions.

(1)
Gas inlet portion 19a: elongated embossed portions+round embossed portions
Gas outlet portion 19b: elongated embossed portions+round embossed portions
(2)
Gas inlet portion 19a: elongated embossed portions+round embossed portions
Gas outlet portion 19b: elongated embossed portions
(3)
Gas inlet portion 19a: elongated embossed portions+round embossed portions
Gas outlet portion 19b: round embossed portions
(4)
Gas inlet portion 19a: elongated embossed portions+round embossed portions
Gas outlet portion 19b: no embossed portion
(5)
Gas inlet portion 19a: elongated embossed portions
Gas outlet portion 19b: elongated embossed portions+round embossed portions
(6)
Gas inlet portion 19a: elongated embossed portions
Gas outlet portion 19b: elongated embossed portions
(7)
Gas inlet portion 19a: elongated embossed portions
Gas outlet portion 19b: round embossed portions
(8)
Gas inlet portion 19a: round embossed portions
Gas outlet portion 19b: elongated embossed portions
(9)
Gas inlet portion 19a: round embossed portions
Gas outlet portion 19b: elongated embossed portions+round embossed portions

DESCRIPTION OF THE REFERENCE NUMERALS 1 fuel cell stack, 2 fuel cell unit, 3 current collector, 5 fuel gas supply manifold, 7 fuel gas discharge manifold, 9 cooling water supply manifold, 11 cooling water discharge manifold, 13 oxidant gas supply manifold, 15 oxidant gas discharge manifold, 16 cooling water passage, 17 gas passage, 19a gas inlet portion, 19b gas outlet portion, 20a cooling water inlet portion, 20b cooling water outlet portion, 21 elongated embossed portion, 23 round embossed portion, 26 folded region, 30 electrolyte film, 31 anode catalyst layer, 32 cathode catalyst layer, 33 anode diffusion layer, 34 cathode diffusion layer, 36 anode separator, 37 cathode separator, 38 groove, 39 porous body passage, 40 groove, 42 first continuous portion, 44 second continuous portion.

The invention claimed is:

1. A fuel cell, comprising:
a pair of gas diffusion layers that sandwich a membrane electrode assembly; and
separators disposed in such a way as to sandwich the pair of gas diffusion layers, wherein a gas passage having an uneven shape is formed on a gas diffusion layer side of the separator;
wherein the gas passage is connected to a gas manifold via a gas inlet portion,
at least one of a communicating width between a first continuous portion that connects the gas inlet portion to the gas manifold and that is a boundary portion between the gas inlet and the gas manifold, and a second continuous portion that connects a gas outlet portion to the gas passage and that is a boundary portion between the gas outlet portion and the gas passage, is different from each other, and
at least one of the gas inlet portion and the gas outlet portion includes embossed portions having an elliptical shape in a plan view and protruding toward a gas diffusion layer side of the separator,
wherein a first major axis direction of the elliptical shape of the embossed portions when included on the gas inlet portion inclines relative to a straight axis connecting one end of the first continuous portion to one end of the gas passage, and a second major axis direction of the elliptical shape of the embossed portions when included on the gas outlet portion inclines relative to a straight axis connecting one end of the second continuous portion to one end of a gas discharge manifold,
the fuel cell further comprising:
a cooling water passage formed on an opposite side of a gas passage surface of the separator; and
a cooling water inlet portion and a cooling water outlet portion formed on back surfaces of the gas inlet portion and the gas outlet portion, respectively,
wherein the cooling water passage is connected to a cooling water manifold via the cooling water inlet portion;
at least one of the cooling water inlet portion and the cooling water outlet portion includes circular embossed portions that protrude toward a cooling water passage surface, wherein the circular embossed portions have a planar shape different from the embossed portion having the elliptical shape; and
the circular embossed portions are formed at end positions of at least one of the first and second major axis directions of the embossed portions having an elliptical shape.

2. The fuel cell according to claim 1, wherein the straight axis connecting the one end of the first continuous portion to the one end of the gas passage is parallel to a flow direction of the gas passage.

3. The fuel cell according to claim 1, wherein a flow direction of cooling water that flows into the cooling water inlet portion from the cooling water manifold, and cooling water that flows from the cooling water outlet portion to the cooling water manifold is not parallel to a flow direction of cooling water in the cooling water passage.

* * * * *